United States Patent [19]

Veazey et al.

[11] Patent Number: 4,650,822

[45] Date of Patent: Mar. 17, 1987

[54] ADHESIVE COMPOSITIONS

[75] Inventors: Richard L. Veazey, East Windsor, N.J.; James O. Bledsoe, Jr., Jacksonville, Fla.

[73] Assignee: Union Camp Corporation, Wayne, N.J.

[21] Appl. No.: 704,167

[22] Filed: Feb. 22, 1985

[51] Int. Cl.$^4$ .............................................. C08K 5/06
[52] U.S. Cl. ................................... 524/376; 524/377; 524/378
[58] Field of Search ...................... 524/378, 376, 377

[56] References Cited

U.S. PATENT DOCUMENTS

| | | | |
|---|---|---|---|
| 2,136,011 | 11/1938 | Humphrey | 568/666 |
| 2,151,769 | 3/1939 | Humphrey | 568/666 |
| 2,182,826 | 12/1939 | Sheffield | 568/666 |
| 2,251,214 | 7/1941 | Sheffield | 568/666 |
| 2,429,858 | 10/1947 | Vincent et al. | 524/285 |
| 3,976,606 | 8/1976 | Gobran | 528/205 |
| 4,066,810 | 1/1978 | Kosaka et al. | 428/195 |

*Primary Examiner*—Joseph L. Schofer
*Assistant Examiner*—N. Sarofim
*Attorney, Agent, or Firm*—Kane, Dalsimer, Kane, Sullivan and Kurucz

[57] ABSTRACT

Terpene ethers are found to be advantageous tackifiers in elastomeric resin based adhesives.

6 Claims, No Drawings

ADHESIVE COMPOSITIONS

BACKGROUND OF THE INVENTION

1. Field of the Invention

The invention relates to adhesive compositions and more particularly relates to elastomeric, polymeric resin based adhesive compositions improved by the inclusion of terpene ethers as tackifier components.

2. Brief Description of the Prior Art

The prior art is replete with descriptions of elastomeric, polymeric resin based adhesive compositions; see for example the descriptions given in the U.S. Pat. Nos. 3,554,940 and 3,792,002.

Likewise, terpene ethers are well known compounds; see for example U.S. Pat. Nos. 2,136,011; 2,151,769; 2,182,826; and 2,251,214.

We have found that high molecular weight terpene ethers are useful as polar tackifiers when incorporated into elastomeric, polymeric rubber resin based pressure sensitive adhesive compositions.

SUMMARY OF THE INVENTION

The invention comprises, in an adhesive composition, which comprises; an elastomeric, polymeric resin and a tackifying proportion of a tackifier compound or compounds, the improvement which comprises; the presence of an oxidatively stable high molecular weight polar terpene ether as a tackifier ingredient.

The term "terpene" as used herein means a mixture of hydrocarbons of the general formulae $C_{10}H_{16}$ or $C_{15}H_{24}$ usually found in association with turpentine or citrus extracts or derived therefrom.

The term "tack" as used throughout the specification and claims means the property of an adhesive to adhere to a surface under light pressure such that an appreciable force is required to effect a clean separation (see Dahlquist, Adhesion Fundamentals and Practice, Chem. and Ind., Chapter 5, 1966, pp. 143–151). Tackifiers are compounds or compositions which when added to the adhesive, enhance tack properties.

DETAILED DESCRIPTION OF THE PREFERRED EMBODIMENTS OF THE INVENTION

The invention is of improved pressure sensitive adhesives of the type based on elastomeric polymeric resins. A wide variety of such resins, both natural and synthetic, and their derivatives are well known as is the method of their preparation. Representative of such resins are natural rubber latex, styrene-butadiene rubber (referred to at times as "SBR"), poly(ethylene-vinyl acetate) (referred to at times as "EVA"), styrene-isoprene-styrene triblock rubber (referred to at times as "SIS"), styrene-butadiene-styrene triblack rubber (referred to as SBS) carboxylated-SBR, poly(acrylates), and the like. Also, Phenol-modified rubbers (Phenol or beta-napthol ("Isolac"))

Oxidized rubbers ("Rubbone")

Chlorinated rubbers in solution ("Parlon" and "Typly")

Rubber hydrochloride ("Pliofilm" and "Marbon" V and X)

Solutions of chloroprene (neoprene cements)

Olefin polysulfide cements ("Thiokol") and the like.

Conventional pressure-sensitive adhesives of the type described above generally include as an ingredient, a tackifying proportion of a tackifier. The improved adhesive compositions of the present invention include as such a tackifier ingredient, a high molecular weigh terpene ether.

Terpene ethers are also well known compounds; see the U.S. Patents identified above. Terpene ethers are, in general, the reaction product obtained by the reaction of a terpene compound with a mono- or a polyhydric alcohol. Representative of such terpene ethers are those of the general formula:

$$(HO)_{n-m} R—O—T)_n \qquad (I)$$

wherein T represents a terpene radical, R represents the residue of an alcohol or polyol after the removal of one or more hydroxyl groups and m and n are intergers of 1 to 8 and n is $\geq m$.

Advantageously, the terpene ether of the formula (I) given above will have an iodine value less than 20 and a molecular weight of more than about 270 up to about 1000; preferably greater than 400 and most preferably greater than 500. Most preferred are the oxidatively and thermally stable terpene ethers described hereinafter.

The terpene ethers of formula I are as stated above the reaction product of a mono- or polyhydric alcohol with a terpene. The term "terpene" as used herein means a hydrocarbon of the general formulae $C_{10}H_{16}$ or $C_{15}H_{24}$, usually found in association with turpentine or citrus extracts or derived therefrom.

The terpene compounds reacted with an alcohol to obtain the terpene ethers of formula (I) given above may be unsaturated monocyclic terpene compounds such as, for example dipentene, α-terpinene, β-terpinene, sylvestrene, γ-terpinene, α-phellandrene, β-phellandrene, terpinolene, limonene, ψ-limonene, isolimonene, 1-menthene,cis-2-menthene,trans-2-menthene,3-menthene,4,8-menthene, or mixtures thereof; or it may be an unsaturated complex cyclic terpene, for example, alpha-pinene, beta-pinene, camphene, carene, tricyclene, cadinene, caryophyllene and bornylene; or it may be an unsaturated linear terpene, for example allo-ocimene, citronellene, pseudocitronellene, ocimene, and myrcene. These terpene compounds need not be in the form of pure compounds, but may be reacted in crude form. Thus, in place of the several pure terpene compounds, crude natural mixtures of terpene compounds as, for example, turpentine, pine oil, etc., or mixtures of terpenes with petroleum or other saturated hydrocarbons may be used. Various fractions from these mixtures may also be used without the necessity of isolating the compounds in their pure state.

The alcohol reactant employed to prepare the terpene ethers of formula (I) given above may be either monohydric or polyhydric. Representative polyhydric alcohols are, for example, ethylene glycol, 1,3-propanediol, 1,4-butanediol, 1,5-pentanediol, 1,6-hexanediol, a polyglycol as diethylene glycol, triethylene glycol, dipropylene glycol, dibutylene glycol, trimethylene glycol; isobutylene-ethylene glycol, trimethylene glycol; the monoethyl, monopropyl or monobutyl ethers of glycerol, dicyclopentadienyl dimethanol, pentaerythritol, dipentaerythritol, tripentaerythritol, trimethylolpropane, trimethylolethane, etc., glycerol, glycerol monoacetate, mannitol, sorbitol, xylose, etc., or mixtures thereof. Monohydric alcohols such as, for example, abietyl alcohol, pimarol, hydrogenated abietyl alcohol, hydropimarol, hydrogenated pyroabietyl alcohol, pyroabietyl alcohol, etc., or mixtures thereof.

The adhesive compositions of the invention are prepared by blending the elastomeric, polymeric resin base with the tackifier terpene ether of formula (I). In preparing adhesive compositions of the present invention, the amounts of tackifier employed relative to the adhesive base vary with the base material. For natural rubber, the ratio of tackifier to adhesive should be approximately 1:1 (on a weight basis), generally in the range of from 5 to 70% tackifier, based upon the total composition weight; for styrene-butadiene rubber, the ratio of tackifier to rubber should be approximately 0.5:1, preferably from about 5 to 60% tackifier, based upon the total composition weight; and for hot-melt adhesives the ratio of tackifier to base should be approximately 1:1, preferably from about 5 to 70% tackifier, based upon the total weight of the composition.

The overall adhesive formula which comprises a composition of the invention may contain other materials which are normally placed in an adhesive. For example, other tackifiers, such as the glycerol ester of hydrogenated rosin, sold commercially as Foral 85 or Staybelite Ester 10, the pentaerythritol ester of hydrogenated rosin sold commercially as Foral 105, the pentaerythritol ester of hydrogenated rosin sold commercially as Pentalyn H, glycerol ester of polymerized rosin sold commercially as Polypale Ester 10, the pentaerythritol ester of polymerized rosin sold commercially as Pentalyn C, rosin-derived dimeric acids sold commercially as Dymerex Resin, the polymerized-C-5 petrochemical olefins sold commercially as Wingtack 10, Wingtack 95, Escorez 1310 and Escorez 5380, the polymerized beta-pinene resins sold commercially as Piccolyte S-resins, Croturez B-resins, Zonarez B-resins, and Nirez T-4115, the polymerized-alpha-pinene resins sold commercially as the Piccolyte A-resin series, the polymerized-limonene resins sold commercially as Piccolyte C-resin series and the polymerized-dipentene resins sold commercially as the Piccolyte D-resin series. For example, if desired, a plasticizer may be incorporated in small amounts into the base material for the adhesive. Similarly, fillers, reinforcing agents, antioxidants, vulcanizers, extenders, softeners, processing aids, activators and accelerators, all as well known in the preparation of natural and synthetic rubber adhesive compositions of the present invention employing the novel tackifier. Similarly, pigments, such as ultra-marine, vermillion, or the like, can be employed to impart a desired color to the overall composition of the invention.

As indicated, the tackifiers used in the present invention can be used to tackify pressure-sensitive adhesives not only of the natural rubber and styrene-butadiene rubber types, but also can be employed in tackifying hot-melt adhesives. The major components of such hot-melt adhesives are generally wax and ethylene/vinyl acetate copolymers. The general formulations of these hot-melt adhesives, except for the tackifier, are those generally employed in the art, such as are illustrated, for example, in U.S. Pat. No. 3,239,478.

The portion of the latter patent which is pertinent to the present disclosure is herein incorporated by reference.

The preferred amount of the tackifier used in the present invention which is incorporated in an adhesive is primarily dependent on the base material, as previously defined, as well as on the use to which the adhesive is to be put. With regard to the latter, the preferred amount of tackifier is that which will generate the lowest overall cost to provide sufficient tack hold, and other performance requirements for the purpose to which the adhesive is to be applied.

The following examples describe the manner and process of making and using the invention and set forth the best mode contemplated by the inventors but are not to be construed as limiting. All parts are by weight unless otherwise indicated.

Where test results are given, the following tests were employed:

(1) Tackiness (Rolling Ball Method)

The surface of a glass plate, 102 mm.×300 mm., was coated with the adhesive in 2 mil thickness and dried at room temperature for 24 hours in an air-conditioned room.

The resultant plate coated with the adhesive was subjected to tackiness testing method described in "Test Methods for Pressure-Sensitive Tapes" (published by the Specification and Technical Committee of The Pressure Sensitive Tape Council, 7th Ed., 1976, pp. 28–29), in which a steel bal 0.438 cm in diameter was allowed to roll down by gravity from a point 15.5 cm from the bottom of the slope at 30° onto the coated glass plate. The distance the ball rolls is inversely proportional to the tackiness of the adhesive coat.

(2) Tackiness (Finger Tack Method)

The resultant plate coated with the adhesive as described in (1) above was tested for finger tack as described herein. The right index finger is moved toward the plate at approximately 1 cm/sec. until contact with the adhesive is made. A light force is applied for 1 second after which time the finger is removed from the adhesive at a speed of approximately 1 cm/sec. The resistance to separation is subjectively classified as none, slight, good or excellent.

(3) Tackiness (Polyken Probe Method)

The surface of a 102 mm×300 mm sheet of irradiated polypropylene 2 mils in thickness was coated with a 20% by weight of a toluene solution of the adhesive such that before drying a 2 mil film was cast. The adhesive was allowed to dry for 24 hours at room temperature (22°–25° C.) in an air-conditioned room.

The resultant coated polypropylene was subjected to the testing method described in an article by Fred H. Hammond, Jr., "A Probe Tack Tester", in *Modern Packaging*, April, 1964. In this method a 1 cm$^2$ stainless steel probe is allowed to contact the adhesive and the maximum force in grams required to separate the probe from the adhesive is measured. Tackiness measurements were made at probe speeds of 0.1 and 1.0 cm/sec. and at 1 and 10 seconds dwell time. Six measurements were made at each probe speed and dwell time sitting and the mean value was recorded.

Probe speed or dwell time effects were calculated by subtracting the slower speed (or dwell time) mean tack value from the higher speed (or dwell time) value and dividing the result by 2.

(4) Peel Strength

The adhesive coated polypropylene sheets as described above were cut into 1 inch wide strips and their peel force to stainless steel was determined as described in "Test Methods for Pressure Sensitive Tapes", 7th Ed., 1976, p. 22.

(5) Shear Adhesion (Holding Power)

The adhesive coated polypropylene sheets as described above were cut into 1 inch wide strips and the hold times to failure were determine as described in "Test Methods for Pressure Sensitive Tapes", 7th Ed., 1976, p. 30.

(6) Tg (by Differential Scanning Calorimetry)

A DuPont 910 Differential Scanning Calorimeter (DSC) with a DuPont 990 Thermal Analyzer Controller was used to determine the Tg values of the terpene ethers, elastomers and adhesive films. The Tg was designated to be the temperature of the inflection point on heating curve when the heating rate is 10° C./min.

The terpene ethers were prepared as described in the following Preparations:

Preparation 1

1,4-CHDM - CAMPHENE DIADDUCT

A mixture of 1217.3 grams of camphene, 428.6 grams of 1,4-cyclohexane dimethanol (1,4-CHDM) and 0.98 grams of trifluoromethanesulfonic acid (TFMSA) were heated to reflux (155° C.) 11 hours. The reaction mixture was cooled to 120° C. and 176.4 g of powdered $Na_2CO_3$ added. The mixture was stirred for 30 minutes, and the fraction distilling at 190°-250° C. at 1 to 4 mm was collected as product. The product weighed 587.2 g.

Preparation 2

A diadduct of trimethylolpropane (TMP) and camphene is prepared according to the reaction scheme:

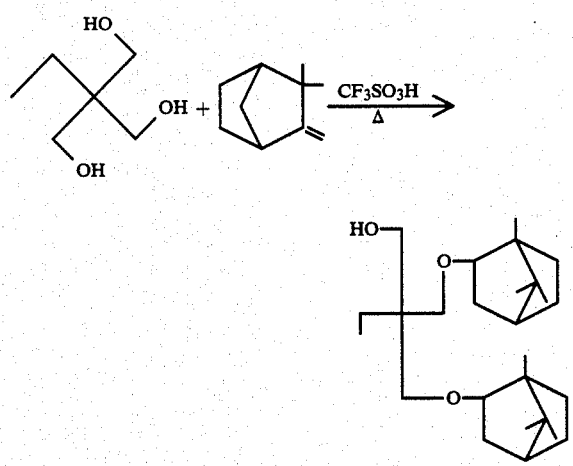

Camphene (884.1 grams) and TMP (248.8 grams) were agitated at 158°±5° C. in the presence of trifluoromethanesulfonic acid, TFMSA, (0.63 g) for 6 hours. The terpene-ether product was isolated by allowing the reaction mixture to cool to room temperature, dissolving it in ether, washing the resulting solution with dilute sodium bicarbonate, and twice with water. The solution was dried over anhydrous magnesium sulfate and filtered. The ether, camphene, and other low boiling materials were distilled away from the product, which distilled between 155° and 183° C. at 0.35 to 0.5 mm Hg. The yield was 693.2 g (1.707 moles) or 92.4 mole percent of the diadduct

Preparation 3

A diadduct of bis(hydroxyethyl)-bis(phenol A), compound A and camphene was prepared by agitating under $N_2$ 63.5 grams of camphene and 66.9 grams together at 160° C. in the presence of 0.1 grams of TFMSA. The product

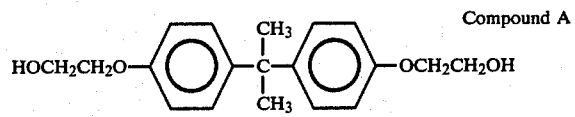

was isolated as described in Preparation 2 above. The yield was 45.8 g of a light yellow solid having a ring and ball softening point of 45°–57° C.

Preparation 4

A diadduct of 4,8-Bis(hydroxymethyl)tricyclo [5.2.1.0^{2,6}] decane sold commercially as TCD-Alkohol DM by Farwerte Hoechst AG) and camphene was prepared by agitating under $N_2$ 408.8 grams of camphene and 196.9 grams of the diol with 0.5 g of TFMSA. The yield was 268.1 grams of a yellow liquid (b.p. 214° to 250° C. at 0.3 mm Hg) which solidified on standing (melting point 67.74° C.).

Preparation 5

Repeating the procedure of Preparation 2, supra., but replacing the camphene with caryophyllene. A 66 mole percent yield of the monoadduct was isolated (b.p. 139°–187° C. at 0.45 to 0.50 mm).

Preparation 6

Repeating the procedure of Preparation 2, supra., but replacing the camphene with alloocimene. A 30.6 mole percent yield of the diadduct boiling at 165°–233° C. at 0.35 to 0.50 mm Hg was isolated.

Preparation 7

Camphene (717.7 g, 5.28 moles) and TFMSA (45 drops) were heated to 155° C. in a nitrogen atmosphere. Pentaerythritol (132 g, 0.97 mole) was added slowly over a period of 1.0 hour, and the reaction mixture was heated an additional 3 hours. The reaction temperature was lowered to 120° C., and 60 g of sodium carbonate was added. The reaction mixture was cooled at 100° C. and filtered through silica gel. n-Heptane was used as a solvent. The solution was separated from the product by distillation at reduced pressures. The product was the pot residue which slowly crystallized. The yield was 527.68 g (90 mole percent) of a product that melted at 40°–45° C.

Preparation 8

A sample of styrene-butadiene rubber (Ameripol 1011 marketed by B.F. Goodrich) containing 23.5% styrene and milled to a 35 Mooney viscosity was stirred for 24 hours at room temperature in enough toluene to make a 20 weight percent solution.

Preparation 9

A proportion of ethylene-vinyl acetate (EVA) polymer (Vynathene EY-903 marketed by USI) containing 45% vinyl acetate was dissolved in enough toluene by stirring at 24° C. for 24 hours to make a 20 weight percent solution of the EVA in toluene.

Preparation 10

A sample of Kraton 1107 Shell Chemical Company's poly(styrene-isoprene-styrene) triblock copolymer, was dissolved in enough toluene by stirring at 24° C. for 24 hours to make a 20 weight percent solution.

Preparation 11

A sample of natural rubber, milled to a 33.5 Mooney viscosity was dissolved in enough toluene by stirring at 24° C. for 38 hours to make a 20 weight percent solution.

The following examples are given which serve to demonstrate the finding of this invention, i.e., that the terpene ether polyols are oxidatively stable in contrast to literature teachings that "ethers tend to absorb and react with oxygen from the air to form unstable peroxides" which decompose on exposure to heat (D. E. Keeley, "Ethers" in *Encyclopedia of Chemical Technology*, Vol. 9, 3rd Edition, H.F. Mark, D. F. Othmer, C. G. Overherger and G. T. Seaborg, editors, John Wiley & Sons, New York, 1980, pp. 381–393). Weight gain in an oxygen atmosphere for those terpene ethers having low iodine numbers is found to be surprisingly low (0.1% in 7 days at 300 psig $O_2$). Other good oxidative stability properties are found in PSA tack tests as described below.

EXAMPLE 1

Pressure sensitive adhesives (PSAs) were prepared by mixing a 20 weight percent toluene solution of the tackifier with a 20 weight percent solution of Vynathene EY-903 ethylene-vinyl acetate copolymer in the proportions of 50 weight percent tackifier to 50 weight percent Vynathene EY-903, (b) casting a 13 mil wet film on irradiated polypropylene and (c) allowing the film to dry 24 hours. The dried films were tested for their tack. The effect of aging PSA films in air for seven days is given in Table 1, below, for each of the compositions compounded with each of the terpene ethers of Preparations 2 and 8, supra., and Hercolyn D., Arizona A-25, and Wingtack 10 for comparative purposes.

TABLE 1

EFFECT OF AGING PSAs AT 60° C. IN AIR FOR SEVEN DAYS

| Elastomer | Tackifier | Tack$^a$ (Grams) Initial | Aged | % Change |
|---|---|---|---|---|
| Vynathene EY-903 (50/50) | Preparation 2 | 412 | 463 | +12 |
|  | Preparation 8 | 616 | 511 | −17 |
|  | Wingtack 10 | 174 | 486 | +179 |
|  | Hercolyn D | 431 | 308 | −29 |
|  | Arizona A-25 | 583 | 354 | −39 |

$^a$Averaged results of six determinations at 1 and 10 seconds dwell time and 1 and 0.1 cm/sec. probe speed.

The data shows a smaller mean tack change for the terpene ethers in Vynathene EY-903 EVA. This implies that PSA's derived from terpene ethers are more stable to tack changes when heated at 60° C. for 7 days than the PSAs tackified with Hercolyn D, Wingtack 10, and Arizona A-25.

EXAMPLE 2

To 40 parts of wax heated to 93° to 121° C. is added 80 parts of either the terpene ether or the comparative resin. The mixture is vigorously stirred until homogeneous. While the mixture is still being stirred there is added 80 parts of the Elvax 250 ethylene vinyl acetate copolymer when the formulation temperature is between 121° to 177° C. The mixture is vigorously stirred an additional 15 minutes, poured into cylindrical containers and placed in an oven at 350°±5° F. Samples are periodically withdrawn and the color and percent skinning is compared to that of the unaged sample. The data presented in Table 2, below, was generated in this manner and shows the greater resistance to color increase and skinning of the terpene ether formulations as compared to that of the other resin formulations.

TABLE 2

TERPENE ETHER STABILITY IN HOT-MELT ADHESIVES

| Resin | Gardner$^a$ Color | Initial Appearance | Day 1 Gardner$^a$ Color | Day 1 Appearance$^b$ (% Skin) | Day 4 Gardner$^a$ Color | Day 4 Appearance$^b$ (% Skin) |
|---|---|---|---|---|---|---|
| Preparation 2 | 1 | C | 3 | C(0) | 8 | CH(5) |
| Preparation 1 | 1 | C | 5 | C(5) | 8 | C(10) |
| Preparation 1 | 1 | C | 4 | CH(3) | 9 | CH(10) |
| Preparation 7 | 3 | C | 5 | C(80) | 8 | CHL(100) |
| Hercolyn D | 3 | C | 8 | C(0) | 13 | CH(30) |
|  | 4 | C | 9 | C(0) | 14 | C(50) |
| Regalrez 1018 | 2 | C | 4 | C(25) | 9 | CHL(100) |
| Piccovar L-60 | 5 | C | 8 | C(100) | 13 | CH(100) |
| Wingtack 10 | 2 | C | 10 | C(80) | 13 | CL(100) |
| Arizona 25 | 6 | C | 11 | C(5) | 13 | C(100) |

$^a$Measured on 50% toluene solutions.
$^b$C = clear, CH = slightly hazy, CHL = slightly hazy and lumpy, CL = clear and lumpy.

EXAMPLE 3

Pressure sensitive adhesives (PSAs) were prepared by (a) mixing a 20 weight percent toluene solution of the tackifier with a 20 weight percent solution of SBR in the proportions of 40 weight percent tackifier to 60 weight percent SBR, (b) casting a 13 ml wet film on irradiated polypropylene, and (c) allowing the film to dry 24 hours. The dried films were tested for their tack. The effect of aging PSA films in air for 7 days is depicted in Table 3, below, for each of the SBR compositions compounded with each of the terpene ethers of Preparations 2, 3, 4, 5, 6, 7 and 8 supra.

Examples 3, 4, 5 and 6 demonstrate the improved tack properties of terpene ethers having higher molecular weights.

EXAMPLES 4, 5 and 6

PSAs were prepared as described in Examples 1, 2 and 3 above, but tack and hold tests were measured on films and air dried 24 hours after casting them. PSAs were made from Preparations 2, 3, 4 and 8, and test results are reported in Table 3, below. The table shows that high molecular weight terpene ethers that do not give cloudy or hazy films have improved tack performance over the lower molecular weight terpene ethers.

TABLE 3
TACK PERFORMANCE OF TERPENE ETHERS OF DIFFERENT MOLECULAR WEIGHTS

| Elastomer | Tackifier | Molecular Weight | Tack Tests Finger | Rolling Ball (mm) | Polyken Probe (Grams) | Hold Tests (Hrs to Failure) | Film Description |
|---|---|---|---|---|---|---|---|
| SBR | Prep 2$^a$ | 406 | good | 55 | 400 | 2 | clear |
|  | Prep 3$^a$ | 416 | excellent | 85 | 400 | 4 | clear |
|  | Prep 4$^a$ | 586 | fair | — | 0 | — | cloudy, caramel film |
|  | Prep 5$^a$ | 442 | good | 59 | 350 | 6.5 | cloudy |
|  | Prep 6$^a$ | 406 | — | — | 350 | 1.3 | — |
|  | Prep 7$^a$ | 544 | good | — | 550 | 4.0 | clear, colorless |
| Vynathene EY-903 | Prep 2$^b$ | 406 | good | — | 400 | 6.2 4.0 | — |
|  | Prep 3$^b$ | 416 | — | — | — | — | — |
|  | Prep 4$^b$ | 586 | — | — | 400 | 96 | — |
|  | Prep 5$^b$ | 442 | — | — | 150 | — | — |
|  | Prep 6$^b$ | 406 | — | — | 400 | 1.5 | — |
|  | Prep 7$^b$ | 544 | good | — | 600 | 56 | — |
| Kraton 1107 | Prep 2$^c$ | 406 | fair | 0 | 450 | .1 | clear, colorless |
|  | Prep 3$^c$ | 416 | good | 185 | 400 | .9 | hazy, hard |
|  | Prep 5$^c$ | 442 | none | — | 0 | 0 | — |
|  | Prep 7$^c$ | 406 | — | — | 300 | — | — |
|  | Prep 8$^c$ | 544 | — | — | 500 | — | — |

$^a$Tackifier to SBR weight percent ratio, 2:3.
$^b$Tackifier to Vynathene EY-603 weight percent ratio 1:1.
$^c$Tackifier to Kraton 1107 weight percent ratio 1:1.

What is claimed:

1. In an adhesive composition, which comprises, an elastomeric, polymeric resin and a tacifying proportion of a tackifier compound having a softening point greater than 35° C., the improvement which comprises; the presence of terpene ethers as tackifier ingredients, said terpene ethers being selected from those of the formula:

$$(HO)_{n-m} R\text{—}(O\text{—}T)_n$$
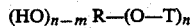

wherein T represents a terpene radical, R represents the residue of an alcohol or polyol after the removal of one or more hydroxyl groups and m and n are integers of 1 to 8 and n is $\geq m$; and wherein the terpene ethers have iodine values less than 20 and molecular greater than 300.

2. The composition of claim 1 wherein the elastomer is selected from the group comprised of styrene-butadiene copolymers, carboxylated styrene-butadiene polymers, styrene-isoprene-styrene copolymers, hydrogenated styrene-ethylene-butadiene styrene polymers, natural rubber of isoprene elastomers, ethylene vinyl acetate copolymers, and polyacrylate elastomers.

3. The composition of claim 1 wherein the terpene ethers are the acid catalyzed reaction products of a terpene and a mixture of an alcohol and polyol.

4. The composition of claim 1 wherein the terpene ethers are the acid catalyzed reaction products of a terpene and a mixture of an alcohol and polyols.

5. The composition of claim 1 wherein the terpene ethers are the acid catalyzed reaction products of a terpene and a mixture of alcohols and a polyol.

6. In an adhesive composition, which comprises an elastomeric, polymeric resin and a tackifying proportion of a tackifier compound having a softening point greater than 35° C., the improvement which comprises; the presence of terpene ethers as tackifier ingredients, said terpene ethers being selected from those of the formula:

$$(HO)_{n-m} R(O\text{—}T)_n$$
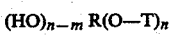

wherein T represents a terpene radical, R represents the residue of an alcohol or polyol after the removal of one or more hydroxyl groups and m and n are integers of 1 to 8 and n is $\geq m$; wherein the terpene ethers have iodine values less than 20 and molecular weights greater than 400; and wherein the terpene ether products are composed of the diadduct products of the reaction of trimethylolpropane and camphene.

* * * * *